United States Patent [19]

Bucher

[11] Patent Number: 4,696,165
[45] Date of Patent: Sep. 29, 1987

[54] SUPERCHARGING SYSTEM FOR AN INTERNAL COMBUSTION ENGINE

[75] Inventor: Jakob Bucher, Bobingen, Fed. Rep. of Germany

[73] Assignee: M.A.N.-B&W Diesel GmbH, Augsburg, Fed. Rep. of Germany

[21] Appl. No.: 800,520

[22] Filed: Nov. 21, 1985

[30] Foreign Application Priority Data

Nov. 28, 1984 [DE] Fed. Rep. of Germany ....... 3443324

[51] Int. Cl.4 ............................................. F02B 37/04
[52] U.S. Cl. ........................................ 60/609; 60/611
[58] Field of Search .................. 60/609, 610, 611, 612, 60/606; 123/559

[56] References Cited

U.S. PATENT DOCUMENTS

| 3,370,417 | 2/1968 | Koziara | 60/611 |
| 3,396,533 | 8/1968 | Fischer | 60/606 |
| 3,462,071 | 8/1969 | Garve | 60/611 X |
| 3,869,866 | 3/1975 | Timoney | 60/607 |
| 4,505,117 | 3/1985 | Matsuoka | 60/609 |

FOREIGN PATENT DOCUMENTS

| 3205721 | 8/1983 | Fed. Rep. of Germany | 60/609 |
| 96433 | 6/1984 | Japan | 60/611 |

*Primary Examiner*—Michael Koczo
*Attorney, Agent, or Firm*—Frishauf, Holtz, Goodman & Woodward

[57] ABSTRACT

Auxiliary compressed air is supplied to an inlet manifold (3) of an internal combustion engine (1) by an auxiliary compressor (8), driven from the main shaft of the ICE. A controlled clutch (17) is interposed between the engine (1) and the auxiliary compressor, the clutch being controlled by a memory and controller (18) receiving inlet manifold pressure signals (P) and fuel quantity signals (F) and providing output control signals to the controlled clutch (17) based on stored functions or tables within the memory and controller to provide for desired and optimum operation of the engine with appropriate charge air in view of injected fuel quantity. The compressed air derived from the auxiliary compressor (8) is injected into the main compressor to impinge on the vanes or blades (15) of the main compressor (6).

8 Claims, 2 Drawing Figures

SUPERCHARGING SYSTEM FOR AN INTERNAL COMBUSTION ENGINE

The present invention relates to internal combustion engines, and more particularly to Diesel engines, including air superchargers, and especially to a control system to control the operation of a supercharger for the internal combustion engine.

BACKGROUND

It has previously been proposed to drive centrifugal compressors from the exhaust gases from an internal combustion engine by coupling an exhaust gas turbine to the radial compressor. In addition, the engine shaft itself can be coupled to an auxiliary compressor to generate compressed air, for example having a pressure in the range of about 2 to 4 bar. If the engine operates under conditions of low air supply, the air compressed by the auxiliary compressor is introduced as an additional supply leading the so-compressed air to a chamber of the centrifugal compressor. The supply line, usually, also includes a check valve so that only air from the auxiliary compressor can be admitted into the chamber of the compressor housing. The chamber from the compressor housing then leads to a plurality of nozzles which are located about the circumference of the centrifugal compressor to admit the air compressed by the auxiliary compressor to the drive vanes of the centrifugal compressor.

A system of this type is described, for example, in German Pat. No. 15 03 581 to which U.S. Pat. No. 3,462,071 corresponds. In the so-described system, a centrifugal compressor is shown driven by an exhaust gas turbine. The auxiliary compressor generates compressed air in the order of 2 to 4 bar which is conducted, via a check valve, into the housing of the centrifugal compressor.

The patent is silent regarding the connection of the auxiliary compressor and its activation or control to the internal combustion engine.

THE INVENTION

It is an object to provide a control system which is simple and inexpensive and suitable to control the operation of the auxiliary compressor.

Briefly, a controlled clutch is connected between the auxiliary compressor shaft and the output shaft of the internal combustion engine (ICE), typically a Diesel engine. A control system controls the engagement or disengagement, respectively, of the controlled clutch. The control system receives input signals representative of air charge pressure to the engine and fuel quantity to be supplied to the engine, for example to be injected to the engine. The controller includes a memory, for example in the form of a stored table or stored functions, in which the air quantity is related to fuel and charge pressure, and provides output signals which, then, respectively control the auxiliary compressor to be connected through the controlled clutch to supply additional air, or to disconnect the auxiliary compressor, thereby eliminating waste of output power from the engine.

The controlled clutch can be simply and easily connected between the output shaft of the ICE and the shaft of the auxiliary compressor. The sensors to sense charge pressure, and fuel quantity, typically injected fuel quantity, are simple and provide reliable output signals, and may be constructed of well known and commercially available components. Pressure switches, for example providing output signals, sensors which provide output signals representative of position of a fuel injection element - thus sensing the quantity of fuel being injected - are well known. The relationship between sensed pressure and fuel quantity, and required charging air, can be stored in the form of functions in electronic read-only memories (ROMs) which receive the respective input signals and provide output signals commanding, for example in an ON/OFF mode, the connection or disconnection of the controlled clutch.

DRAWINGS

FIG. 1 is a general schematic diagram of the system in accordance with the invention; and FIG. 2 is a fragmentary sectional view through a radial compressor with means for additionally introducing auxiliary air.

DETAILED DESCRIPTION

Figure 1:
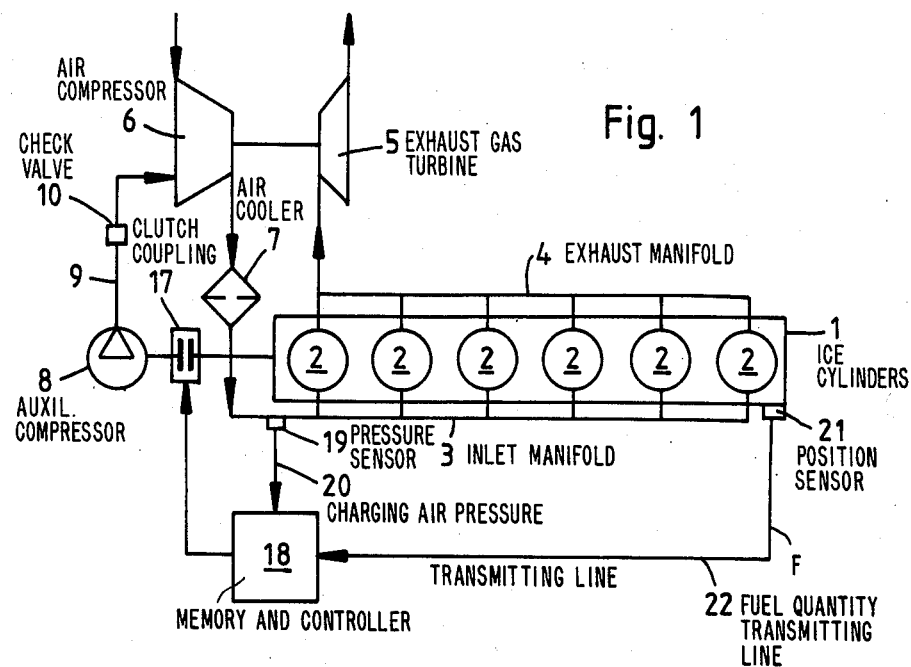

An internal combustion engine (ICE) 1 has a plurality of cylinders 2 which are all supplied with charging air from an inlet manifold 3. Exhaust gases are collected in an exhaust manifold 4. The exhaust manifold 4 is connected to at least one exhaust gas turbine 5 which drives a radial main compressor 6. The main compressor supplies charging air from a an inlet A to the inlet manifold 3. Preferably, a charging air cooler 7 is interposed in the output line from the compressor 6 and the inlet manifold 3.

An auxiliary compressor 8 is connected to the output shaft of the ICE 1. The auxiliary compressor can provide compressed air at a pressure in the order of between about 2 to 4 bar. If the operating mode of the ICE is such that insufficient air becomes available therefor, compressed air is supplied from the auxiliary compressor 8 through an outlet line 9 to a check valve 10 for subsequent connection to a closed space 11 - see FIG. 2 - in the housing 12 of the centrifugal compressor 6.

Figure 2:
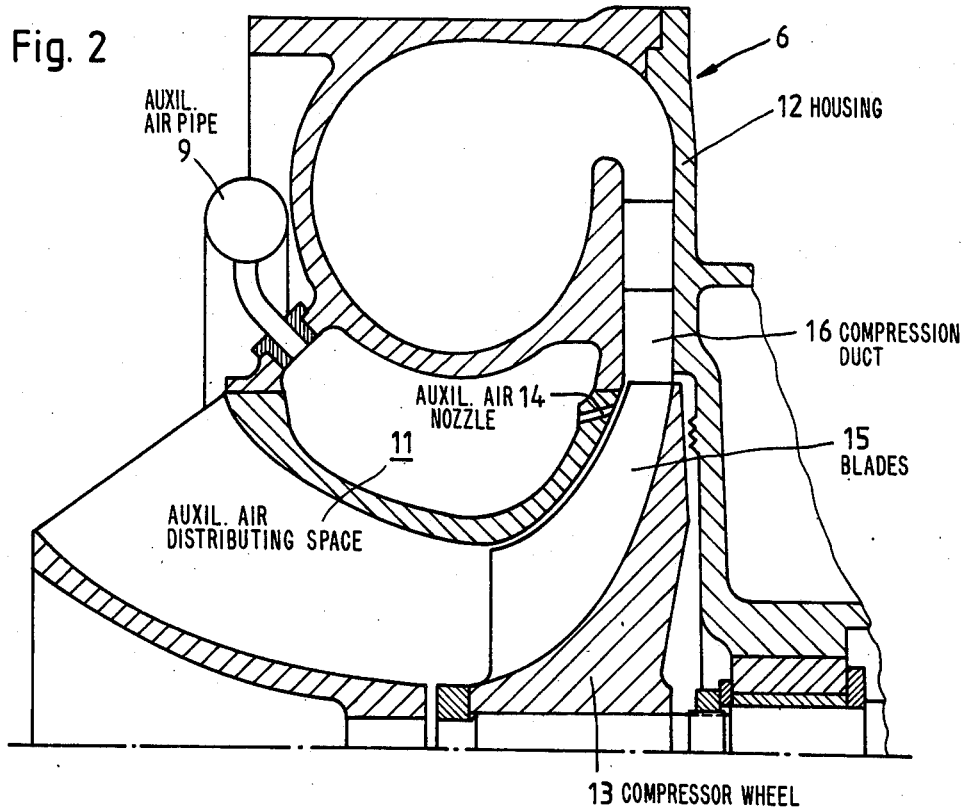

As best seen in FIG. 2, the housing 12 of the centrifugal compressor 6 has a plurality of nozzles 14 located therein, positioned over the entire outer circumference of the compressor vanes or blades 15 of the compressor wheel 13. Thus, compressed air is supplied via the compressor vanes to the compression duct 16. The chamber 11 is used only as a manifold or distributor for the air from the auxiliary compressor 9. The check valve 10 has been omitted from FIG. 2 for clarity. The nozzles 14 are so directed that compressed air will impinge on the vanes or blades 15 at an angle of about 15° to 30° with respect to the plane of rotation of the compressor wheel.

The auxiliary compressor may be of any well known suitable type, for example a Roots blower or booster, or a piston compressor.

In accordance with a feature of the invention, a controlled clutch 17 is connected in the shaft driving the auxiliary compressor 8 from the ICE 1. Clutch 17 is controlled by a memory and control unit 18. The memory and controller 18 receives input command signals representative of charge pressure P and of fuel to be supplied to the ICE, F. The system is particularly suitable for Diesel engines, so that the fuel quantity F will be representative of fuel to be injected into the combustion chambers of the cylinders 2. The memory and controller 18 stores a plurality of functions or stores tables relating actual conditions of operation of the engine, as derived from the sensed pressure and fuel quantity signals, to desired conditions and, in accordance therewith, provides output signals which control engagement or disengagement, respectively, of the clutch 17 and hence operation or disconnection of the auxiliary compressor 8.

In accordance with a preferred feature of the invention, the memory and controller 18 includes an electronic system and output circuitry such as amplifiers which provide electrical output command signals and output command energy to the clutch operating element of the clutch 17. For example, the output signals may control a solenoid or other magnetically operated apparatus to command engagement or disengagement of the clutch 17.

The controller 18 receives a signal from a transducer 19, coupled to the inlet manifold and sensing the charging air pressure within the inlet manifold to provide a corresponding electrical signal to an actual charge condition connecting line 20. A transducer 21 is coupled to a fuel injection pump - not shown - and provides an output signal via an actual fuel quantity connecting line 22 which is representative of the position of a control rod or the like, controlling the quantity of fuel to be injected by a fuel injection pump. Such a transducer may, for example, be a simple electromagnetic position transducer. The electrical position signal is then available on the actual position line 22.

The signals on lines 20 and 22, thus being representative of charge air pressure and fuel quantity, are then associated by the memory and controller 18, based on functions or tables stored therein, to obtain an output which will command whether the auxiliary compressor 8 should be operated or not.

OPERATION

Let it be assumed that the ICE 1 is operating, first, under idling or low-load conditions and should be accelerated to accept higher loading. In order to increase the power output of the ICE, the quantity of fuel will have to be increased which is sensed by the position sensor 21, sensing the position of the fuel control element, such as a fuel control rod, and transferred to the controller 18 in form of a representative electrical signal on line 22. At the same time, the controller 18 will reeive a signal from the pressure sensor 19 which, under the conditions assumed, will transmit a signal indicating that the air pressure is insufficient for optimum combustion at the given amount of fuel which is being injected. The stored tables or functions in the memory or controller 18 will be so arranged that, if the air is not enough for the required fuel, an output will be provided so that the controller 18 will command clutch 17 to engage, thereby activating operation of the auxiliary compressor 8. The auxiliary compressor 8 will provide compressed air which is supplied to the radial main compressor 6 over line 9 and check valve 10.

Upon acceleration of the engine, more exhaust gases will be generated which will operate the compressor 6 to supply more air and, with both compressors 6 and 8 operating, the quantity of air in the inlet manifold will cause a pressure in excess of that for optimum combustion. When excess pressure is sensed sensor 19 transmits a pressure signal P to the memory and controller 18 of adequate or even excess charge pressure. Controller 18 will determine that too much air or too high air pressure is present in relation to the optimum performance, as stored in the memory portion thereof and cause disengagement of the clutch 17, thereby disconnecting the auxiliary compressor 8. No more auxiliary air will be supplied, and check valve 10 will prevent leakage of air from the main air compressor 6 through the cooler 7 to the inlet manifold. The compressor 6 can be so designed that, under steady-state conditions, the air being supplied to the inlet manifold 3 is appropriate for optimum operation of the engine. A closed loop is provided for the compressor 6 since the turbine 5, driving the compressor 6, is itself driven by the exhaust from the engine 1.

A suitable pressure transducer 19 is: EMP 2. producd by Danfoss in Danmark with an output level of 4 . . . 20 mA (DC).

A suitable transducer 21 is: TGM 4. produced by Hartmann & Braun in W-Germany.

A suitable memory and controller element, or assembly of elements, is: SHARP Pocket Computer PC 1500 A in connection with the measuring-and controlsystem MC 12, produced by BMC Dr.Schetter in W-Germany.

I claim:

1. Supercharging control system for an internal combustion engine (ICE) (1) having
    an exhaust gas turbine (5) driven by exhaust gases from the ICE (1);
    a main air compressor (6) driven by the exhaust gas turbine (5) and providing compressed air to an inlet manifold (3) of the ICE (1),
    an auxiliary air compressor (8) driven by rotary power derived from the ICE to provide additional air to said main compressor (6);
    a controlled clutch (17) drivingly connected to the auxiliary compressor (8) and the ICE (1) to selectively establish or disconnect rotary drive power between the ICE (1) and the auxiliary compressor (8);
    fuel quantity sensing means (21) for sensing quantity of fuel being supplied to the ICE (1) and providing a fuel quantity signal (F);
    air pressure sensing means (19) coupled to an air inlet (3) of the ICE for sensing charging air pressure and providing an air pressure signal (P);
    and comprising ;
    a memory and controller (18) coupled to control, selectively, establishment and disconnection of the rotary drive power between the ICE and the auxiliary compressor, and
    wherein
    said memory and controller is coupled to receive the air pressure signal (P) and the fuel quantity signal (F) and storing the relationship between air supply pressure and fuel quantity for desired performance of the ICE;
    said memory and controller (18) provides an output signal coupled to and controlling the controlled clutch (17) to obtain said desired performance;
    and wherein said main compressor (6) comprises a centrifugal compressor including nozzles (14) positioned about the outer circumference of a chamber within which rotary blades (15) of the centrifugal compressor operate, said nozzles (14) receiving compressed air from the auxiliary compressor (8) and being oriented to apply additional drive power to the main compressor (6).

2. System according to claim 1, wherein the memory and controller (18) stores said relationship relating air supply pressure and fuel quantity, and provides operating control signals to the controlled clutch (17) to provide said desired performance by selectively causing additional air from the auxiliary compressor to be supplied to the air inlet manifold of the ICE if the air pressure signal (P) and the fuel quantity signal (F) do not meet the stored characteristics of the engine which result in said desired performance.

3. System according to claim 1, wherein the pressure sensing means (19) comprises a pressure transducer coupled to the inlet manifold (3) of the engine and provides said air pressure signal (P), and the fuel quantity sensing means (21) comprises a position transducer, independently sensing the quantity of fuel being supplied to the ICE (1) and providing said fuel quantity signal (F), said air pressure signal (P) and said fuel quantity signal (F) being independently connected to said memory and controller (18).

4. System according to claim 1, wherein the auxiliary air compressor (8) provides compressed air at a pressure of between about 2 to 4 bar.

5. System according to claim 1, wherein said memory and controller compares operation supply parameters of the engine comprising air charge pressure (P) and fuel supply (F) with the stored relationships and, selectively,
   (1) upon detecting excess fuel, controls said clutch (17) to engage and
   (2) upon detecting excess air pressure, controls said clutch (17) to disengage.

6. System according to claim 4 wherein said nozzles (14) are in air flow communication with said compressor chamber or manifold (11).

7. System according to claim 6 wherein said nozzles (14) have an angle of inclination of between about 15° to 30° with respect to the plane of rotation of the compressor wheel.

8. System according to claim 4 wherein a check valve (10) is provided, connected to receive compressed air from said auxiliary air compressor (8); and
   wherein connection means are provided to connect the compressed air from the auxiliary compressor to a compressor chamber or manifold (11) of said main compressor (6).

* * * * *